(12) United States Patent
Koike et al.

(10) Patent No.: US 8,711,520 B2
(45) Date of Patent: Apr. 29, 2014

(54) DEVICE WITH A FLOATING HEAD HAVING A HEATER ELEMENT

(75) Inventors: Minoru Koike, Odawara (JP); Eiji Nakanishi, Minami-ashigara (JP); Yoshinori Takeuchi, Ishioka (JP); Hiroshi Agari, Odawara (JP); Hiroyuki Matsumoto, Chigasaki (JP); Takayoshi Ohtsu, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 450 days.

(21) Appl. No.: 12/970,775

(22) Filed: Dec. 16, 2010

(65) Prior Publication Data

US 2011/0149429 A1 Jun. 23, 2011

(30) Foreign Application Priority Data

Dec. 17, 2009 (JP) ................................. 2009-286992

(51) Int. Cl.
*G11B 5/60* (2006.01)
*G11B 21/21* (2006.01)

(52) U.S. Cl.
USPC .................................... 360/235.7; 360/294.7

(58) Field of Classification Search
USPC .......... 360/235.1, 235.2, 235.3, 235.7, 236.5, 360/237, 236.3, 237.1, 294.7, 125.31, 360/125.74
See application file for complete search history.

(56) References Cited

U.S. PATENT DOCUMENTS

| 6,891,699 | B2 | 5/2005 | Kameyama et al. |
| 7,064,930 | B2 * | 6/2006 | Serpe et al. ................. 360/236.5 |
| 7,542,243 | B2 * | 6/2009 | Lou et al. .................... 360/294.7 |
| 7,679,863 | B2 | 3/2010 | Hashimoto et al. |
| 7,729,088 | B2 * | 6/2010 | Kurita et al. ................ 360/234.4 |
| 2005/0213250 | A1 * | 9/2005 | Kurita et al. ................ 360/234.4 |
| 2006/0007594 | A1 * | 1/2006 | Umehara et al. .............. 360/126 |
| 2007/0064332 | A1 | 3/2007 | Higashiya |

FOREIGN PATENT DOCUMENTS

| JP | 2003/288710 A | 10/2003 |
| JP | 2007/073165 A | 3/2007 |
| JP | 2007/087516 A | 4/2007 |
| JP | 2007/287287 A | 11/2007 |
| JP | 2008/226370 A | 9/2008 |
| JP | 2009/059424 A | 3/2009 |
| JP | 2009/151890 A | 7/2009 |

* cited by examiner

*Primary Examiner* — Jefferson Evans
(74) *Attorney, Agent, or Firm* — Zilka-Kotab, PC (57) ABSTRACT

In one embodiment, a method of manufacturing a magnetic disk includes rotating a magnetic disk, supporting a floating head on the rotating magnetic disk, the floating head having a slider body and an element unit formed on a trailing edge of the slider body, contacting a floating surface of the slider body with the magnetic disk, and protruding a portion of the floating head toward the magnetic disk due to application of power to a heater element within the element unit, wherein the element unit is positioned away from the magnetic disk. In another embodiment, a floating head includes a slider body comprising AlTiC, an element unit positioned on a trailing edge of the slider body, the element unit having an initial recess amount of at least about 4 nm, and a heater element positioned within an alumina protective film of the element unit.

19 Claims, 9 Drawing Sheets

DEVICE WITH A FLOATING HEAD HAVING A HEATER ELEMENT

RELATED APPLICATIONS

The present application claims priority to a Japanese Patent Application filed Dec. 17, 2009 under Appl. No. 2009-286992, which is herein incorporated by reference.

FIELD OF THE INVENTION

The present invention relates to a floating head device for floating a head on a magnetic disk, and a method of manufacturing a magnetic disk.

BACKGROUND

Storage devices which employ disks with which to store data thereon, such as optical disks, magnetic disks, and/or opto-magnetic disks, are well known. Of these, hard disk drives (HDD) are now in widespread use as external storage devices. In addition, the use of HDDs is not limited to computers, as they are used in many other applications, such as video recording and playback devices, satellite navigation systems, digital cameras, music players, etc.

A HDD generally has a magnetic disk and a magnetic head which accesses the disk and floats on the magnetic disk. The magnetic head generally includes a slider and an element unit (head element unit) on the slider. The smaller the gap between the recording and playback element of the head element unit and the recording layer of the magnetic disk, the greater improvements may be made in the magnetic disk recording density. To this end, efforts to reduce the floating height of the slider body have been made with improvements in data recording density for the HDD.

One way to improve data recording density in a HDD is to narrow the "magnetic spacing," which is the gap between the recording element/reading element mounted on the magnetic head and the magnetic film formed on the surface of the magnetic disk. The magnetic film may be formed via sputtering or the like. The design value for the clearance between the magnetic disk and the magnetic head, in other words the distance from the protective coating on the magnetic disk to the lowest float point of the magnetic head, has been reduced to a few nanometers in current head designs.

Thus, taking into account a reduction in the floating height of the magnetic head with the increased recording density of the magnetic disk, the possibility of contact occurring between the magnetic disk and the magnetic head is increased greatly. Head/disk contact that occurs in the process of reading or writing can lead to deterioration in performance and the loss of data. Moreover, damage can occur to the head element unit where the impact of the contact is significant. For this reason, a greater smoothness is desired of the magnetic disk to reduce the probability of contact between the magnetic disk and the slider having a lowered floating height.

In the manufacture of a magnetic disk, a burnish process is carried out using a floating head (burnish head) which removes any unnecessary protrusions formed on the disk. The burnish process floats a burnish head on the magnetic disk to remove protrusions from the magnetic disk, using the burnish head to remove any unnecessary protrusions formed on the disk due to foreign objects in the film forming. The burnish process smoothes out the surface of the magnetic disk. Moreover, in the manufacture of the magnetic disk, a glide test may be carried out after the burnish process. The glide test floats a floating head (glide head) on the magnetic disk to test the condition of the magnetic disk surface (the floating condition of the head slider in an HDD), e.g., to determine the smoothness of the magnetic disk surface.

In the burnish process, it is desirable to have the clearance (minimum distance) between the burnish head and the magnetic disk surface as small as possible, in order to improve the smoothness of the magnetic disk. Moreover, to reduce head/disk contact in the HDD, clearance of the burnish head is preferably set to a value close to the clearance in the HDD during use. Furthermore, the glide test is a test of the float condition for the magnetic head in the HDD, so clearance between the glide head and the magnetic disk must be a value close to the clearance in a HDD when the HDD is in use.

A technique to fit the magnetic head with an actuator which adjusts clearance has been proposed to meet the reduced clearances discussed previously. For example, Japanese Patent Publication No. 2009-151890 discloses a technique whereby a heater element is provided in the head element unit, and the clearance between the head element unit and the magnetic disk is adjusted using the heat from this heater element.

As described above, in the burnish process and glide test it is desirable to reduce the clearance between the burnish head/glide head and the magnetic disk. However, it is difficult to obtain a similar clearance to that obtained using the heater element by design improvements to the floating surface of the slider alone. For this reason, it is preferable to carry out clearance control using a heater element in the burnish head/glide head as is used with the head slider in a HDD during use.

However, when a magnetic head mounted in a HDD is used in the burnish process and glide test, it is clear that there is a significant problem with durability during and after testing. There is a desire to reduce element clearance in a HDD. To achieve this, the head element unit may be made to protrude from the remainder of the head due to heat produced by the heater element, such that the tip of the head element unit positioned closest to the surface of the magnetic disk protrudes. When the magnetic head touches the magnetic disk, the head element unit touches the magnetic disk, not the slider body.

When the magnetic head of the HDD is used in the manufacturing of a magnetic disk, the same magnetic head is required to carry out a large number of burnish processes and glide tests on the magnetic disk. However, damage occurs to the head element unit each time head contact occurs, and when there are a large number of contacts between the magnetic head and the magnetic disk, it becomes necessary to change the magnetic head. For this reason, there is a need for a technology to improve the durability of the magnetic head in addition to reducing the clearance between the floating head and the disk in the burnish process and glide test prior to use of the magnetic disk in a HDD.

SUMMARY

In one embodiment, a method of manufacturing a magnetic disk includes rotating a magnetic disk, supporting a floating head on the rotating magnetic disk, the floating head having a slider body and an element unit formed on a trailing edge of the slider body, contacting a floating surface of the slider body with the magnetic disk, and protruding a portion of the floating head toward the magnetic disk due to application of power to a heater element of the element unit, wherein the element unit is positioned away from the magnetic disk.

According to another embodiment, a device for floating a head on a magnetic disk includes a disk rotating drive unit for rotating a magnetic disk, a floating head for floating on the rotating magnetic disk, the floating head comprising a slider body and an element unit formed on a trailing edge of the slider body, a support mechanism for supporting the floating head on the magnetic disk, and a controller for bringing the magnetic disk into contact with a protruding portion of the floating head, wherein the protruding portion is made to protrude due to application of power to a heater element of the element unit, and the element unit is positioned away from the magnetic disk.

In another embodiment, a floating head includes a slider body comprising AlTiC, an element unit positioned on a trailing edge of the slider body, the element unit having an initial recess amount of at least about 4 nm, and a heater element positioned in an alumina protective film of the element unit.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a method of manufacturing a magnetic disk includes rotating a magnetic disk, supporting a floating head on the rotating magnetic disk, the floating head having a slider body and an element unit formed on a trailing edge of the slider body, contacting a floating surface of the slider body with the magnetic disk, and protruding a portion of the floating head toward the magnetic disk due to application of power to a heater element of the element unit, wherein the element unit is positioned away from the magnetic disk.

According to another general embodiment, a device for floating a head on a magnetic disk includes a disk rotating drive unit for rotating a magnetic disk, a floating head for floating on the rotating magnetic disk, the floating head comprising a slider body and an element unit formed on a trailing edge of the slider body, a support mechanism for supporting the floating head on the magnetic disk, and a controller for bringing the magnetic disk into contact with a protruding portion of the floating head, wherein the protruding portion is made to protrude due to application of power to a heater element of the element unit, and the element unit is positioned away from the magnetic disk.

In another general embodiment, a floating head includes a slider body comprising AlTiC, an element unit positioned on a trailing edge of the slider body, the element unit having an initial recess amount of at least about 4 nm, and a heater element positioned in an alumina protective film of the element unit.

According to one embodiment, a method of manufacturing a magnetic disk is presented. This method of manufacture rotates the magnetic disk. A floating head is supported on the rotating magnetic disk. Here, the floating head is provided with a slider body and an element unit formed on the trailing edge of this slider body. Moreover, part of the slider body is brought into contact with the magnetic disk with part of the floating head made to protrude through the application of power to a heater element within the element unit, and the element unit is kept away from the magnetic disk. In this way, it is possible to improve the durability of the floating head in addition to reducing the clearance between the floating head and the magnetic disk.

The floating surface of the slider body is preferably provided with a first air bearing surface which generates a positive pressure, with its center more toward the outflow side than to the center of the floating surface, and a second air bearing surface smaller than the first air bearing surface and on the outflow side of the first air bearing surface. The method of manufacturing brings the floating head into contact with the magnetic disk by causing the second air bearing surface to protrude through the application of power to the heater element. In this way, it is possible to efficiently cause part of the slider body to protrude.

The second air bearing surface is preferably completely separated from the first air bearing surface by a groove between the first air bearing surface and the second air bearing surface. In this way, it is possible to cause the second air bearing surface to protrude more easily.

It is preferable that a portion of the first air bearing surface extends to both the inner periphery and the outer periphery of the second air bearing surface. In this way, it is possible to reliably float the trailing edge of the floating surface, and reduce variation in the head gap at the inner periphery, center, and outer periphery of the magnetic disk.

An initial recess amount for the element unit is preferably 4 nm or more. In this way, it is possible to reliably keep the element unit away from the magnetic disk.

The initial recess amount for the element unit is preferably deeper than the deepest groove in the floating surface of the slider body. In this way, it is possible to more reliably keep the element unit away from the magnetic disk.

Another embodiment shows a device which floats a head on a magnetic disk. This device is provided with a disk-rotating drive unit which rotates the magnetic disk, a floating head which floats on the rotating magnetic disk, and is provided with a slider body and an element unit formed on the trailing edge of the slider body, a support mechanism which supports the floating head on the magnetic disk, and a controller which brings the slider body and the magnetic disk into contact with part of the floating head made to protrude through the application of power to a heater element within the element unit, with the element unit kept away from the magnetic disk. In this way, it is possible to improve durability of the floating head and reduce the clearance between the floating head and the magnetic disk.

A further embodiment is a floating head provided with a slider body formed of AlTiC, an element unit formed on the trailing edge of the slider body whose initial recess amount is about 4 nm or more, and a heater element formed within the alumina protective film of the element unit. In this way, it is possible to improve the durability of the floating head, causing part of the slider body to come in contact with the disk while reducing the clearance between the floating head and the disk due to expansion caused by a heater element.

According to one approach, it is possible to improve the durability of the floating head in addition to reducing the clearance between the disk and the head which floats on the disk.

The following describes a preferred embodiment. For convenience' sake, omissions and simplifications have been made in the following description and drawings to clarify the explanation. Furthermore, in the drawings, the same elements are keyed with the same symbols, and repeated descriptions have been omitted where necessary for the sake of clarity. In the embodiment, the description will use a hard disk drive (HDD) as an example of a magnetic disk device and/or drive. The magnetic disk device/drive is a device which floats a head on a magnetic disk.

A burnish process and a glide test are carried out in the manufacture of a magnetic disk, in one approach. The burnish process floats a head on the magnetic disk to carry out the removal of protrusions on the surface of the magnetic disk. The glide test floats a head on the surface of the magnetic disk, and tests the surface of the magnetic disk. The manufacture of a magnetic disk in this embodiment reduces clearance for the burnish process and the glide test using a heater element formed on the slider.

This ensures a more preferable smoothness for the surface of the magnetic disk and enables an appropriate test of the magnetic disk surface to be carried out, in some embodiments. In one embodiment, the floating head may include either a structure comprising a slider alone or a structure comprising a slider and an element unit on this slider. Moreover, there is no limitation on the structure of the element unit.

In reducing the clearance of the heater element, the lowest position on the floating head is part of the slider body, not the element unit containing the heater element. In this way, the robust slider body comes into contact with the magnetic disk and not the easily damaged element unit. It is thus possible to prevent damage to the floating head even where the floating head repeatedly impacts with (protrusions on) the magnetic disk.

Figure 1:
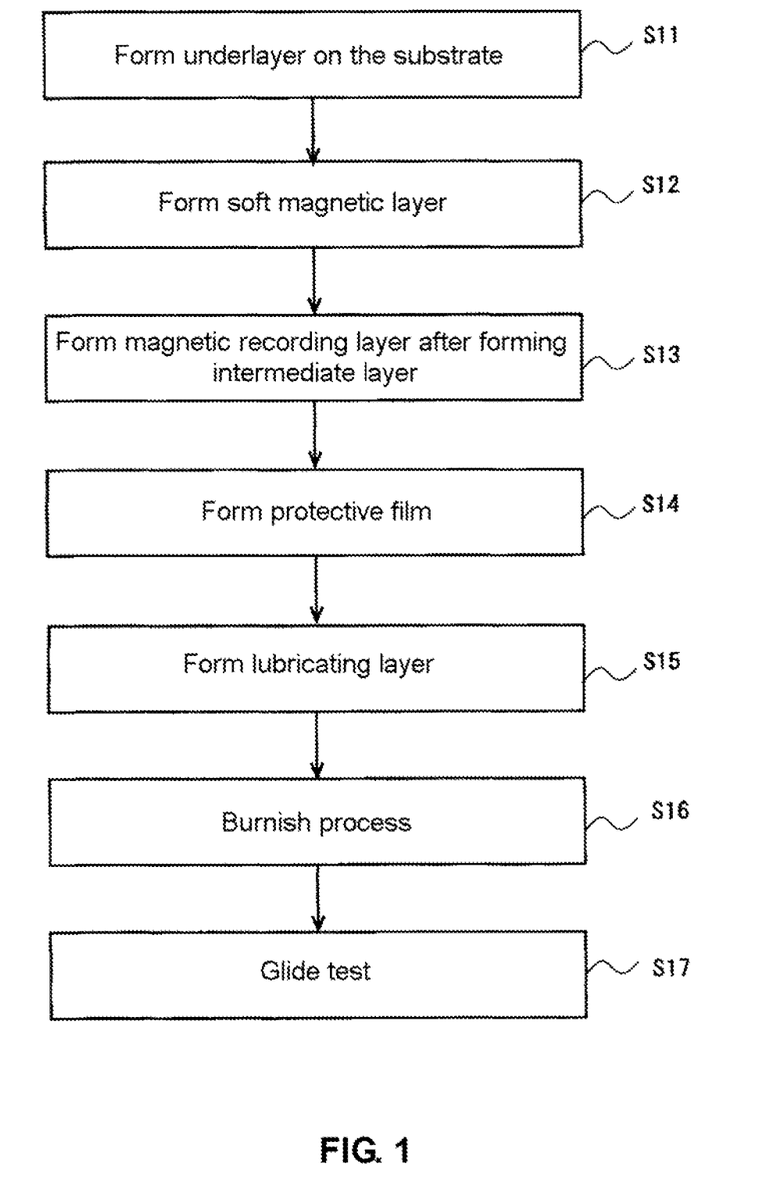
FIG. 1 is a flowchart illustrating a process of manufacturing a magnetic disk, according to one embodiment.

As shown in the flowchart in FIG. 1, the manufacture of a magnetic disk includes forming a laminated film comprising a plurality of layers, including the magnetic recording layer, on a substrate, and carrying out a subsequent burnish process and a glide test. Where protrusions which exceed the stipulated conditions are detected in the glide test, the magnetic disk is either rejected as a defect or subjected to another burnish process. An example of the flow of the manufacture of a magnetic disk is described with reference to the flowchart in FIG. 1.

An underlayer is formed on a substrate of glass or aluminum after it has been washed and dried (as shown in S11). Next, a soft magnetic layer is formed on the underlayer (as shown in S12). This soft magnetic layer may comprise a CoCr alloy magnetic film. An intermediate layer is then formed on the soft magnetic layer, and then the magnetic recording layer is formed above this layer (as shown in S13). The intermediate layer may comprise an Ru layer, and the magnetic recording layer may comprise a CoCrPt alloy magnetic film.

The soft magnetic layer and the magnetic layer may bond together due to the Ru intermediate layer, and the alignment of the magnetic recording layer may be controlled, in some approaches. After forming the magnetic recording layer, a protective film of diamond-like carbon (DLC) may be formed on the magnetic recording layer (as shown in S14). Finally, a lubricating layer may be formed by coating a lubricating agent, such as perfluoro alkyl polyester, on the DLC protective layer (as shown in S15).

Once the formation of the laminated layer is complete (as shown in S11-S15), the magnetic disk is placed in a burnishing device and burnished (as shown in S16). The burnish process is a process for removing protrusions on the magnetic disk or for cleaning it. The burnishing device moves the floating slider on the rotating magnetic disk in the radial direction of the disk, and removes protrusions on the surface of the magnetic disk through collisions with the slider.

Once surface protrusions on the magnetic disk have been removed in the burnish process (as shown in S16), the magnetic disk is placed in a glide test device, and the glide test is carried out (as shown in S17). The glide test is a test which tests the condition of the surface of the magnetic disk. The glide test device moves the floating head over the rotating magnetic disk in the radial direction of the disk, and tests for the presence of protrusions on the surface of the disk by moving the floating head in the radial direction of the disk. The glide test is designed to test that there are no protrusions which form an obstruction to the floating of the head on the surface of the magnetic disk.

The burnish process (as shown in S16) and the glide test (as shown in S17) can be carried out in the same device. In this case, a magnetic disk on which a film has been formed may be positioned in the burnish/glide test device, and after the device has removed dust and minute protrusions on the surface of the magnetic disk with the head floating on the rotating magnetic disk, it uses the same floating head to carry out a test of the surface in a glide test carried out immediately thereafter.

Figure 2:
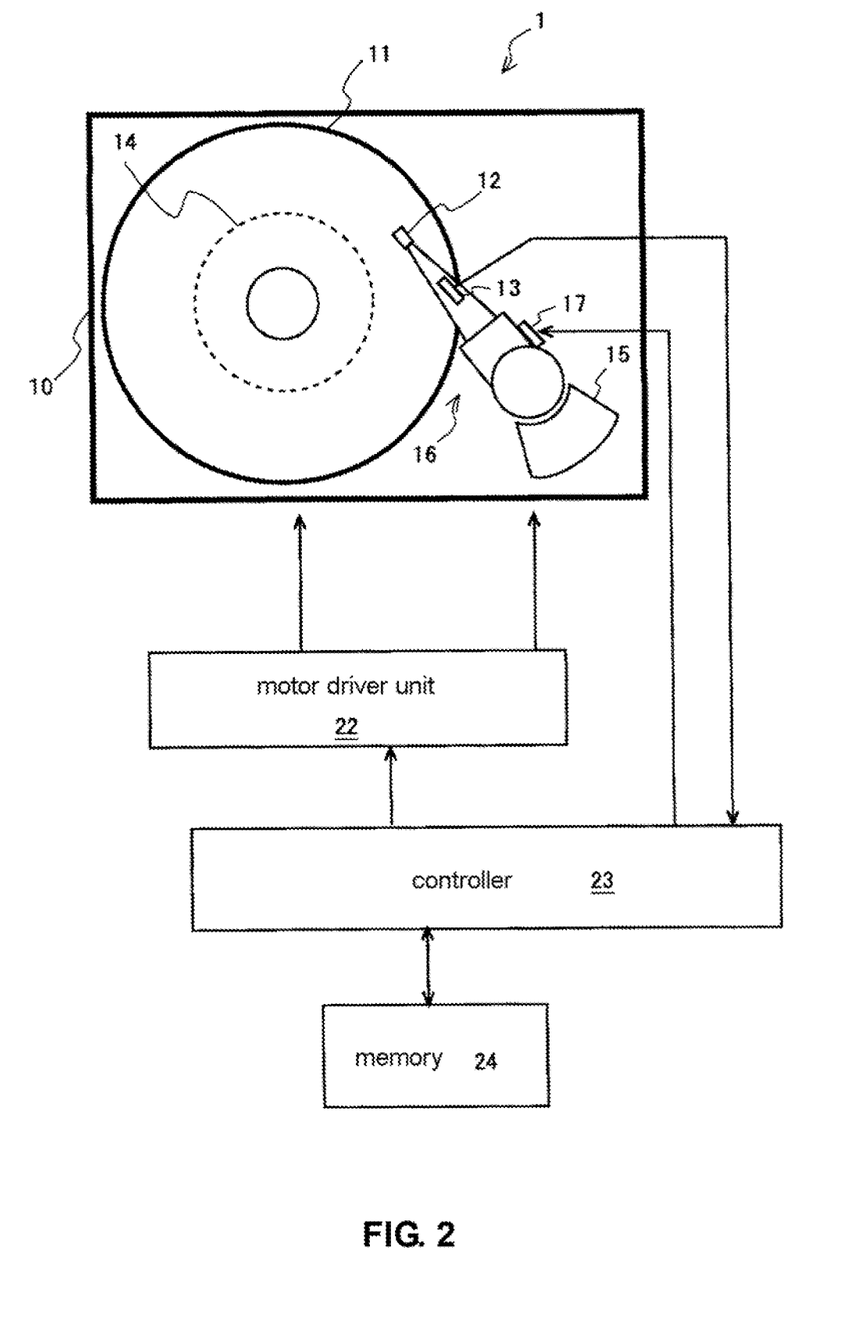
FIG. 2 is a diagram schematically illustrating a structure of a glide test device, according to one embodiment.

FIG. 2 is a diagram schematically illustrating a structure of a glide test device 1, according to one embodiment. In frame 10, spindle motor (SPM) 14 rotates magnetic disk 11 which is the subject of the test at a designated angular speed. Magnetic disk 11 comprises a substrate with laminated layers formed above the substrate, as described previously. Floating head (glide head) 12 floats on the rotating magnetic disk 11.

In this embodiment, floating head 12 is provided with a slider (slider body) which floats on the magnetic disk 11 and an element unit formed on the side surface of this slider. The element unit is provided with a heater element, and varies the clearance between magnetic disk 11 and floating head 12. The manufacture of the floating head 12 is described later.

Actuator 16 supports the floating head 12, moving it above the magnetic disk 11. Actuator 16, which is the moving mechanism for the floating head 12, is linked to voice coil motor (VCM) 15, and moves the floating head 12 on the rotating magnetic disk 11 in its radial direction by rotation through an axis of rotation. The moving mechanism for the floating head 12 may have a structure of any kind. For example, it may have a structure identical to the actuator of the HDD in which the magnetic disk 11 is fitted, or may have a structure which moves linearly over the axis in the radial direction of the disk.

Motor driver unit 22 drives the SPM 14 and the VCM 15 in accordance with control data from controller 23. Controller 23 controls the operation in the glide test device 1 in addition to controlling the SPM 14 and the VCM 15. Moreover, the controller 23 analyses the test results.

Actuator 16 is mounted with acoustic emission sensor (AE sensor) 13. When the floating head 12 contacts the magnetic disk 11, the actuator 16 oscillates. AE sensor 13 detects the oscillation of the actuator 16, and sends a detection signal to the controller 23. Controller 23 is provided with a DA converter, and carries out DA conversion on the AE output signal, determining the presence of contact between the floating head 12 and the magnetic disk 11 from the AE signal. For example, where the AE output exceeds a certain threshold, the controller 23 determines that there is an impact between a protrusion and the floating head 12. Controller 23 stores the measured data and the results of determination in memory 24.

As described above, in one embodiment, the floating head 12 may be provided with a heater element to control clearance. Controller 23 controls clearance by controlling the heater element. More specifically, the controller 23 controls a heater element via preamp integrated circuit (IC) 17. Controller 23 sets control data showing the heater power in the register of the preamp IC 17. Preamp IC 17 supplies the heater element with the power indicated by this control data.

Where the burnish process and the glide test are carried out using the same device, the controller 23 must carry out a process for detecting protrusions in the burnish process using the AE sensor 13. After executing the burnish process, the glide test begins immediately. Controller 23 may set the clearance differently for the burnish process and the glide test, or may set the clearance to be identical.

Figure 3A:
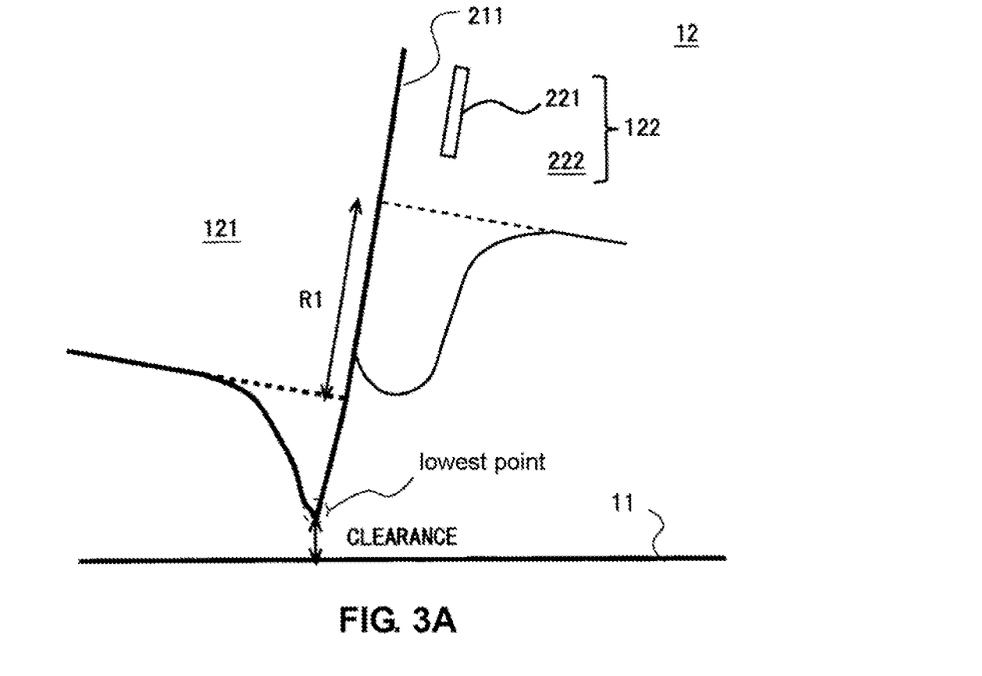
FIG. 3A is a diagram illustrating a structure of the floating head and changes to the clearance (floating height) and head shape due to a heater element, according to one embodiment.
Figure 3B:
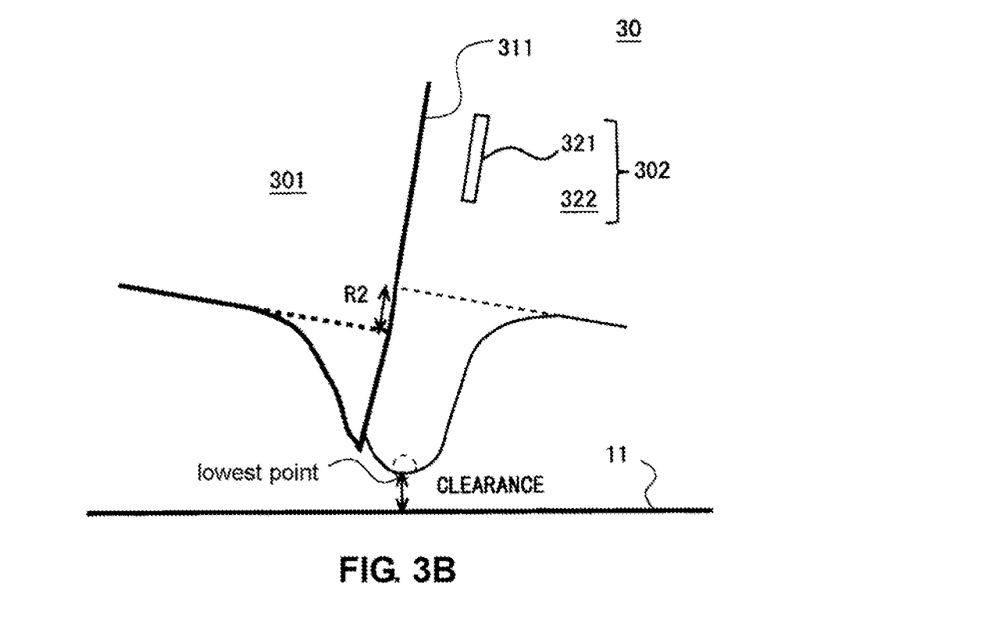
FIG. 3B is a diagram illustrating a structure of the floating head and changes to the clearance (floating height) and head shape due to a heater element, in a comparative example.

In what follows, a more detailed description is given of the structure of floating head 12, according to one embodiment, and changes to the clearance and the shape of the floating head 12 caused by the heater element. FIG. 3A illustrates changes to the shape of the floating head 12 in one embodiment. FIG. 3B shows changes to the shape of the floating head 30 in a comparative example. Parts indicated by the solid line illustrate the shape of the floating heads 12, 30, floating on the magnetic disk 11 in the glide test or burnish process.

Floating head 12 in one embodiment may be provided with a slider body 121 and an element unit 122 formed on a trailing edge 211 of the slider body 121. Element unit 122 is formed from the heater element 221 and a surrounding protective film 222. Floating head 30 in the comparative example is identical, being provided with the slider body 301 and the element unit 302 formed on the trailing edge 311 of the slider body 301. Element unit 302 is formed of the heater element 321 and the surrounding protective film 322. The material of the main parts of the structure is identical for the floating head 12 in this embodiment and the floating head 30 of the comparative example.

Slider body 121 may be formed of ALTIC (AlTiC). ALTIC is a ceramic which is a sintered body of alumina and titanium carbide. Heater element 221 may be formed of permalloy and/or nichrome. Moreover, the protective layer 222 may be formed of alumina. Slider body 121 may be provided with a structure that is more robust than the element unit 122.

In the burnish process or glide test, element unit 122 does not need to carry out a read or write process. For this reason, the element unit 122 does not need to be provided with these elements. However, in some embodiments, element unit 122 may be provided with a read element (magnetoresistance effect element) or a write element (coil element).

Floating head 12, according to one embodiment, and the floating head 30 of the comparative example, differ in the initial recess amount for element units 122, 302. As shown in FIG. 3A and FIG. 3B, the initial recess amount for floating head 12 in one embodiment is indicated by R1, and the initial recess amount for floating head 30 in the comparative example by R2. The initial recess amount is the level difference (gap) between the trailing edge at the floating surface of slider bodies 121, 301 and the floating surface (lower surface facing the magnetic disk) of element units 122, 302. The initial recess amount is defined in a state where heater elements 221, 321 are not emitting heat, as this dimension may change with the application of power to the heater elements 221, 321.

The initial recess amount R1 for floating head 12 in one embodiment is larger than the initial recess amount R2 for floating head 30 in the comparative example. In other words, when the heaters are off, the clearance between magnetic disk 11 and element unit 122 in one embodiment is greater than the clearance between magnetic disk 11 and element unit 302 in the comparative example.

When heater elements 221, 321 emit heat to element units 122, 302, the trailing edges of slider bodies 121, 301 protrude as shown in FIG. 3A and FIG. 3B. With floating head 30 of the comparative example, the tip of element unit 302 (lowest end) becomes the lowest point of floating head 30 when element unit 302 and slider body 301 protrude due to the heat from heater element 321. At the same time, with floating head 12 in one embodiment, the lowest end of slider body 121 (trailing edge of the floating surface) becomes the lowest point of floating head 12 when part of element unit 122 and slider body 121 protrude due to the heat from heater element 221.

As described above, the diagrams shown respectively in FIG. 3A and FIG. 3B show the shape of the floating heads 12, 30 floating on the magnetic disk 11 in the manufacturing process for a magnetic disk. In these processes, the object of clearance control for floating head 30 in the comparative example is the clearance between element unit 302 and magnetic disk 11. Distinct from this object, one object of clearance control in floating head 12 in one embodiment is clearance between slider body 121 and magnetic disk 11.

In this way, the lowest point of floating head 12 in one embodiment is the lowest point of slider body 121, not element unit 122. Thus, contact with protrusions on the surface of the magnetic disk 11 occurs between slider body 121 and magnetic disk 11, not with element unit 122. In this way, it is possible to increase the durability of the floating head 12 and avoid significant damage, even where there are multiple contacts between the floating head 12 and the magnetic disk 11.

Figure 4:
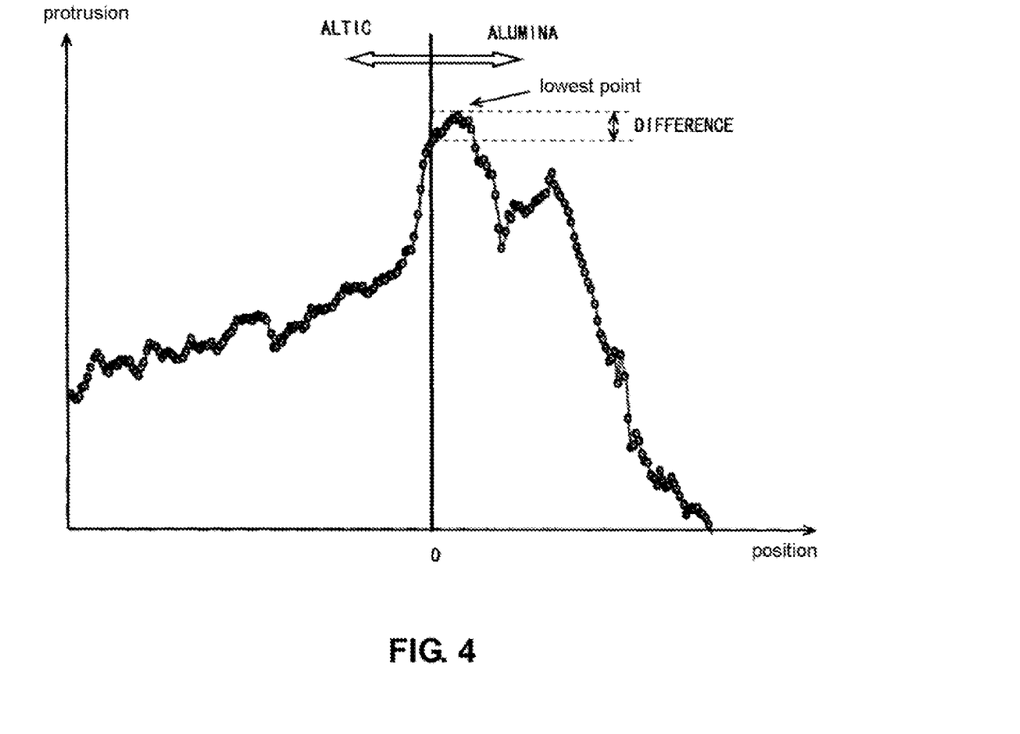
FIG. 4 is a graph illustrating the results of measuring clearance for the floating head with an element unit having a heater element formed on a trailing edge, according to one embodiment.

One preferred method of changing the shape of element unit 122 and slider body 121 so that the heat from the heater element 221 formed in the element unit 122 causes the slider body 121 to come closer to the magnetic disk 11 than the element unit 122 is to increase the initial recess amount of the element unit 122. FIG. 4 is a graph illustrating the results of measuring the clearance of the floating head formed on the trailing edge for the element unit having a heater element, in one approach. The slider body was formed of AlTiC, and the protective layer for the element unit formed of alumina.

In the graph in FIG. 4, the x-axis shows a relative position of the slider body using the trailing edge (indicated by 0) as a reference, with the y-axis indicating the position to which the floating surface of the floating head protrudes. The heater was supplied with the power used in an actual process. This means that the larger the value on the y-axis, the closer the position to the magnetic disk. As shown in FIG. 4, for the floating head used in measurement, the tip of the element unit was the lowest point in the position closest to the magnetic disk.

The difference between the lowest point of the element unit (lowest point on the floating head) and the lowest point on the slider body was 1 nm. The initial reset amount for the floating head was 2 nm. For this reason, as long as the initial recess amount is greater than 3 nm, the trailing edge of the slider body can be made the lowest point on the floating head using the heat from the heater element. Taking into account variations in the floating head, and also to reliably avoid the effect of impacts with protrusions on the element unit, the floating head may preferably have an initial recess value of about 4 nm or more.

To enable the slider body to be positioned closer to the magnetic disk than the element unit, it is effective for the trailing edge of the slider body to have a shape which protrudes easily with application of heat from the heater element so that these can be deformed by the heat from the heater elements. In what follows, a description is given of a preferred shape for the slider body 121, in one embodiment.

Figure 5A:
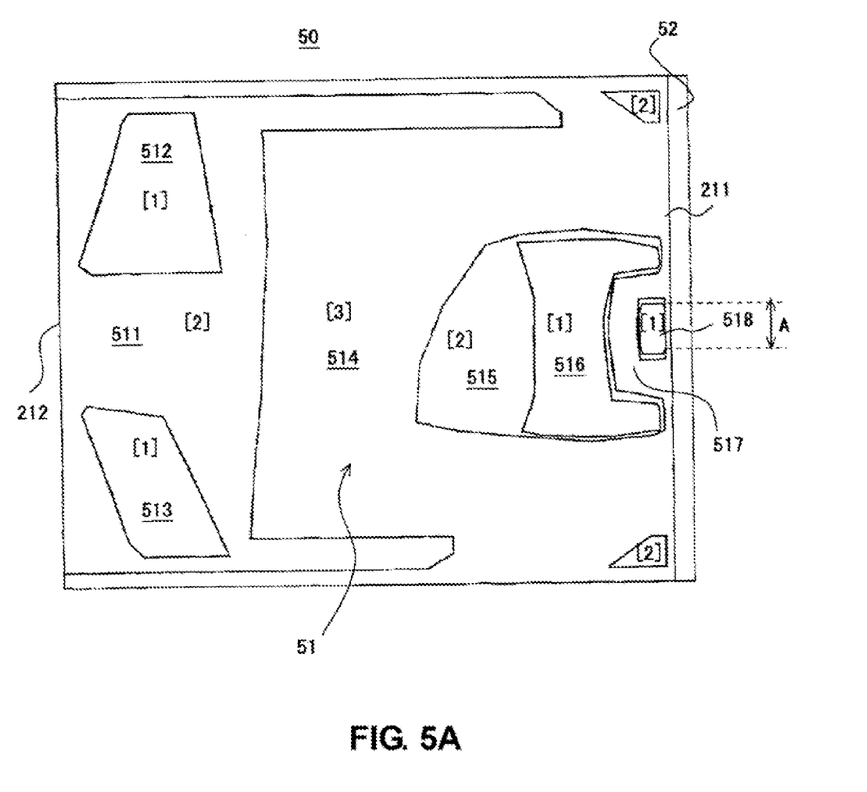
FIG. 5A is a plan view illustrating a preferred structure for a floating surface of a floating head, according to one embodiment.
Figure 5B:
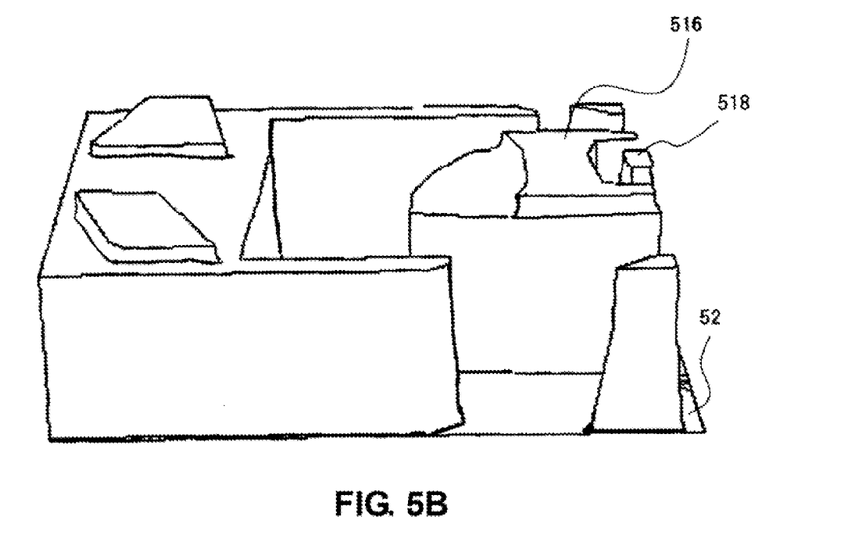
FIG. 5B is an oblique view illustrating a preferred structure for a floating surface of a floating head, according to one embodiment.

FIG. 5A is a plan view schematically illustrating a preferred structure of the floating surface of the floating head 12. FIG. 5B is an oblique view of the same. In FIG. 5A, the floating surface 50 of floating head 12 is provided with a floating surface 51 of the slider body 121 and the floating surface 52 of the element unit 122. Floating surface 50 is the surface opposite the recording surface of the magnetic disk 11. Slider body 121 is provided with a leading edge 212, which is the inflow end, and a trailing edge 211, which is the outflow end.

Magnetic disk 11 rotates, thereby drawing air into the surface. As the air passage narrows between the floating surface 50 of the floating head 12 and the surface of the magnetic disk 11, the air is compressed, the pressure increases, and the pressure acts on the floating surface 50. This pressure exerts a lifting force, which balances the suppress strength of the suspension which supports the floating head 12.

With the floating surface of the slider body shown in FIG. 5A, surfaces indicated by the same numbers ([1]-[3]) are formed at the same level (height). The surface most to the front is defined as the highest surface on the floating surface (the surface with the highest level). Surface [1] is the air bearing surface of the surface furthest to the front, and is the height of the reference surface for the floating surface 51 of the slider body. Surface [2] is the second highest surface on the bottom of the shallow groove (step surface), and surface [3] is the lowest surface and is the bottom of the deep groove.

Floating surface 51 of the slider body is provided with surfaces such as inflow step surface 511, inflow-side pad surfaces 512, 513, central deep groove bottom 514, central step surface 515, outflow-side central pad surface 516, outflow deep groove bottom 517, and island pad surface 518 on the outflow side of outflow-side central pad surface 516. Pad surfaces 512, 513, 516, 518 are air bearing surfaces. The air enters between the floating surface 51 and the magnetic disk 11 from the inflow end, and is compressed at the inflow step surface 511. The compressed air flows to inflow-side pad surfaces 512, 513, where a large positive pressure is generated.

Air flowing over the central deep groove bottom 514 from the inflow step surface 511 is compressed at the central step surface 515. The compressed air flows over outflow-side central pad surface 516 where a large positive pressure is generated. The center of outflow-side central pad surface 516 (center in the direction of float) is more toward the outlet end than the center of the floating surface 51. Moreover, in this example the whole of the outflow-side central pad surface 516 (inlet end) is more to the outlet side rather than the center of the floating surface 51, but part of outflow-side central pad surface 516 may be more to the inflow side than the center, according to various embodiments.

Island pad surface 518 is formed at a distance from the outflow-side central pad surface 516 on the outflow side of the outflow-side central pad surface 516. Outflow deep groove may be present between outflow-side central pad surface 516 and the island pad surface 518, and a positive pressure is generated by the air flowing to the island pad surface 518 from its bottom surface 517, in one approach.

Island pad surface 518 protrudes with the heat generated by the heater element 221, the clearance of floating head 12 (minimum float height) being determined in the space between the island pad surface 518 and the magnetic disk surface. To ensure the island pad surface 518 protrudes effectively with heat from the heater element 221 of the element unit 122, the heater element 221 is preferably formed in projected area A on the outlet side on the trailing edge 211 with the island pad surface 518 in the normal direction of the trailing edge 211.

Island pad surface 518 is completely separated from the outflow-side central pad surface 516 by a groove, in one approach. The protrusion of the island pad surface 518 due to heat from the heater element 221 makes it easier for part of the slider body 121 to protrude, and easier for part of the slider body 121 to become the lowest point of the floating head 12. This structure frees up the design for the element unit 122, and allows heater power to be reduced.

Figure 6A:
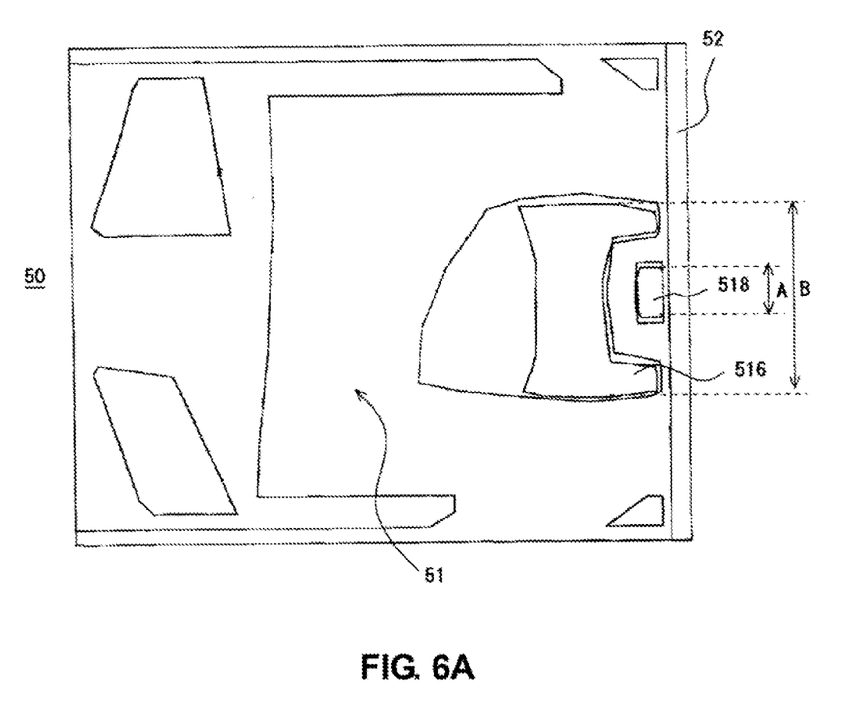
FIG. 6A is a plan view of a floating surface of a floating head, according to one embodiment.

Floating surface 50 of the floating head, in one embodiment, as described above, is characterized in the island pad surface 518. FIG. 6A is a plan view of floating surface 50 of the floating head 12, in one embodiment, with FIG. 6B being a plan view illustrating a conventional floating surface 60 in a comparative example. FIG. 6A is identical to FIG. 5A.

Figure 6B:
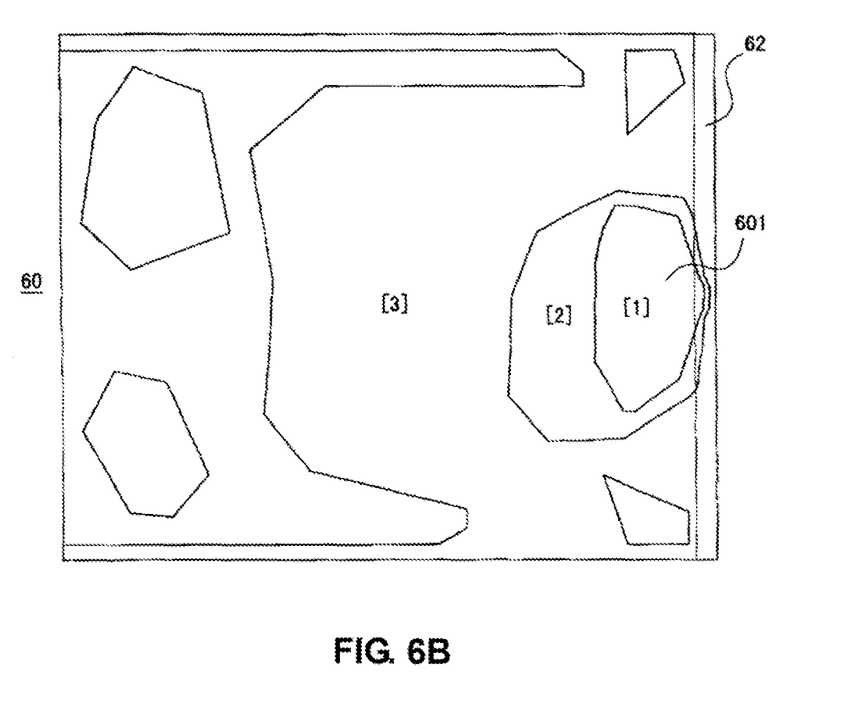
FIG. 6B is a plan view illustrating a conventional floating surface in a comparative example.

Conventional floating surface 60 has large outflow-side central pad surface 601 extending to the bailing edge of the slider body, and does not have a pad surface corresponding to the island pad surface 518 in this embodiment. Moreover, floating surface 62 of the element unit has regions at the same level as outflow-side central pad surface 601. In practice, the floating surface 62 of the element unit is slightly lower than the outflow-side central pad surface 601, and an initial recess is present which is formed in a polishing process in the manufacture of floating head 12.

With the floating surface 50 in the embodiment shown in FIG. 6A, the island pad surface 518 which protrudes significantly due to heat from the heater element 221 is completely separated from the outflow-side central pad surface 516 by a groove. The surface area of the island pad surface 518 is smaller than the surface area of the outflow-side central pad surface 516. It is possible to allow the island pad surface 518 to protrude more easily with heat from the heater 221 by reducing the surface area of the island pad surface 518.

The surface area of the island pad surface 518 is preferably 20% less than the surface area of the outflow-side central pad surface 516, in one embodiment. The formation of a large outflow-side central pad surface 516 on the inlet side of the island pad surface 518 allows the necessary lift to be obtained at the trailing edge even when the surface area of the island pad surface 518 is small.

To more reliably enable island pad surface 518 to float, it is preferable that the whole of the island pad surface 518 be contained in projected region B on the outlet side, with the outflow-side central pad surface 516 in the normal direction of trailing edge 211. Moreover, whatever position the floating head 12 is in within this range from the innermost periphery to the outermost periphery of the disk, it is preferable that the whole of the island pad surface 518 be included in the projected region on the outflow side in the direction of airflow (circumferential direction) of the outflow-side central pad surface 516.

As shown in FIG. 6A, part of the outflow-side central pad surface 516 is preferably present both on the inner periphery and the outer periphery and not just on the inflow side of the island pad surface 518, in some approaches. It is possible to obtain a reliable float for the trailing edge while keeping the surface area of the island pad surface 518 small by having the outflow-side central pad surface 516 extend in the three directions of the outflow-side central pad surface 516 (beyond the outflow side), and to reduce variation in the floating height on the inner periphery, the center, and the outer periphery. Moreover, it is possible to suppress the adhesion of foreign objects to the island pad surface 518 by enclosing three sides of the island pad surface 518 with the outflow-side central pad surface 516, in more approaches.

In the floating surface 50 shown in FIG. 6A, a step surface is formed on three sides of the island pad surface 518 apart from the outflow side, and a deep groove is formed on the outflow side of the island pad surface 518, in one embodiment. Depending on the design, a deep groove may be provided all around the island pad surface 518. Alternatively, the island pad surface 518 may be surrounded by a shallow groove, and the area between the island pad surface 518 and the outflow-side central pad surface 516 then connected by a step surface (bottom of the shallow surface). The island pad surface may be formed in the center in the radial direction of the disk, but it may also be formed toward either the inner periphery or the outward periphery, in other embodiments.

Figure 7A:
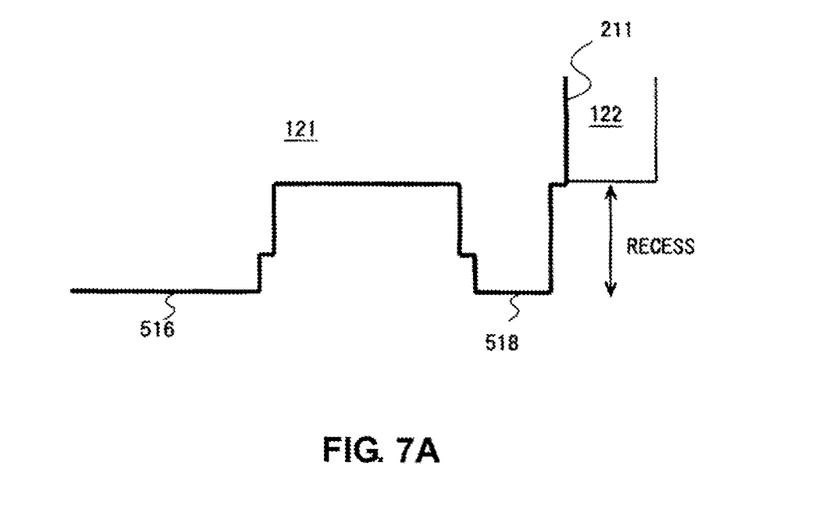
FIG. 7A is a cross-section schematically illustrating a preferred initial recess position for an element unit, according to one embodiment.

In FIG. 7A, in a preferred example of the structure, the island pad surface 518 does not reach as far as the trailing edge 211 and an air bearing surface is not formed on the element unit 122. The surface of level [3], that is the bottom of a deep groove, is formed on the outflow side of the island pad surface 518, with the position of the floating surface of the element unit 122 approximately matching this level. As described above, to make the slider body 121 protrude more than the element unit 122, it is preferable that the initial recess amount of the element unit 122 be large. In this example of the structure, the initial recess amount (distance from the lowest point of the slider) of the projecting part in the element unit 122 is greater than the depth of the deep groove.

Figure 7B:
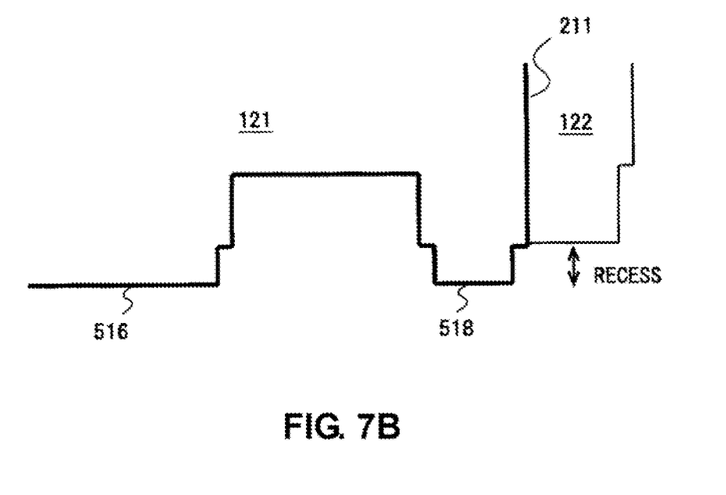
FIG. 7B is a cross-section schematically illustrating another preferred initial recess position for an element unit, according to one embodiment.

In order for the island pad surface 518 to protrude more easily than with a conventional slider mechanism, the initial recess amount of the element unit 122 can be made smaller. However, in a preferred structure, an air bearing surface is not formed on the element unit 122, the element unit 122 being preferably formed so as to be continuous with the bottom of the shallow groove or the bottom of the deep groove of the slider body 121. As shown in FIG. 7B, when the floating surface of the element unit 122 approximately matches the level of the bottom of the shallow groove, the initial recess amount is greater than the depth of the step surface which is at the bottom of the shallow groove.

Figure 7C:
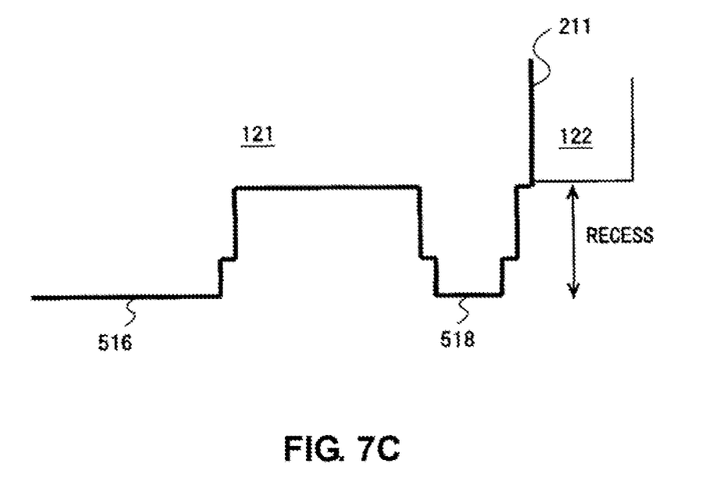
FIG. 7C is a cross-section schematically illustrating another preferred initial recess position for an element unit, according to one embodiment.

As shown in FIG. 7C, a shallow groove and deep groove may be formed like steps between the island pad surface 518 and the trailing edge 211. The initial recess amount is preferably greater than the depth of the shallow groove, and preferably will be deeper than the depth of the deep groove. This point is the same for a floating head with a conventional outflow-side central pad surface structure. The depth of the shallow groove is typically several nanometers, with the depth of the deep groove being several thousand nanometers.

Figure 8A:
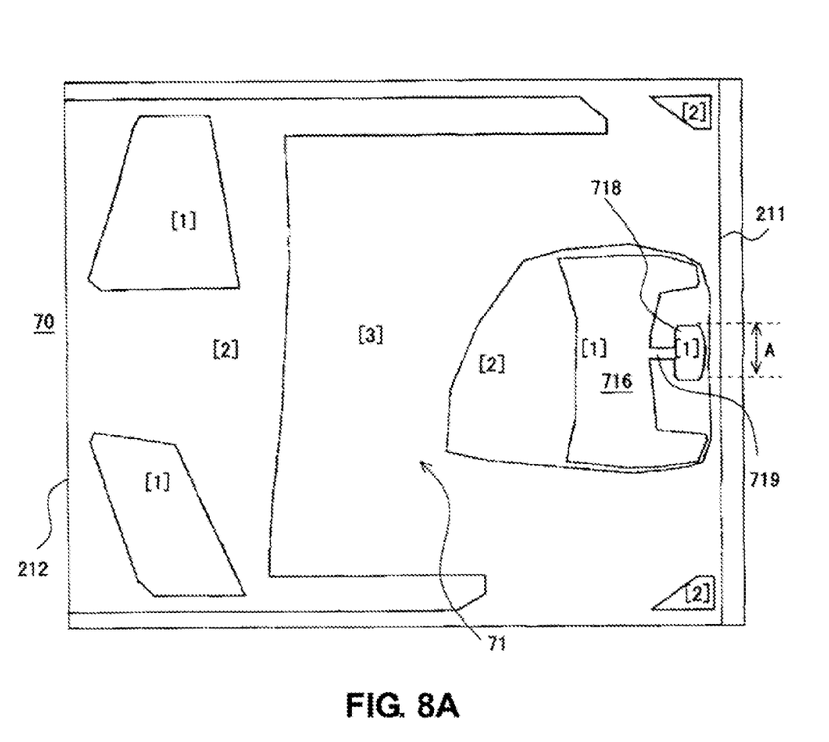
FIG. 8A is a plan view illustrating another preferred structure for a floating surface of a floating head, according to one embodiment.
Figure 8B:
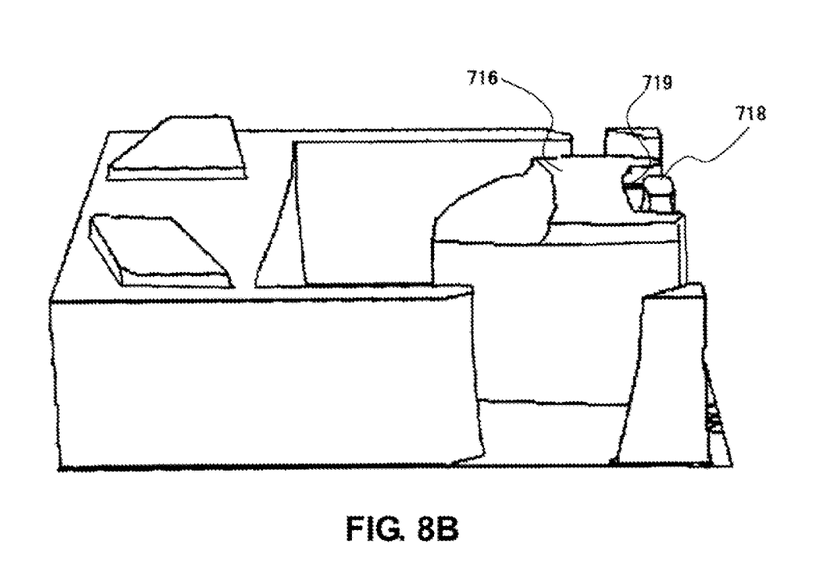
FIG. 8B is an oblique view illustrating another preferred structure for a floating surface of a floating head, according to one embodiment.

FIGS. 8A-8B are diagrams illustrating the structure of another preferred floating surface. FIG. 8A is a plan view of the floating surface 70, with FIG. 8B being an oblique view of the same. The difference from the floating surface 50 shown in FIG. 5A, 5B is the shape of the pad surface protruding due to the heater element 221. The other parts are effectively identical in the shapes of the two floating surfaces, and in what follows a description is given of the shape of the pad surface and its surroundings which protrude due to the heat, in some embodiments.

With floating surface 71 of the slider body, the pad surface 718 which protrudes due to the heat of the heater element 221 is not completely separated from the outflow-side central pad surface 716, and the bridge surface 719 is formed between them at the same level as these. The larger part around the pad surface 718 is surrounded by a groove, and is separated from the outflow-side central pad surface 716, but one part is connected to the outflow-side central pad surface 716 by the bridge surface 719.

Bridge surface 719 extends in the direction of the outflow/inflow of air (the vertical direction in the diagram), with the pad surface 718 and the outflow-side central pad surface 716 connected. The maximum width of the bridge surface 719 (the dimension in the left/right direction in the diagram) is smaller than the width of the outflow end and the inflow end of the pad surface 718. The effect of the bridge surface 719 on the protrusion of the pad surface 718 due to heat from the heater element 221 is small, and there is nothing to effectively prevent this protrusion.

To effectively cause the pad surface to protrude using the heat from the heater element 221, it is preferable to have a complete separation from the outflow-side central pad surface 516 on the inlet side as in the case of the island pad surface 518 described with reference to FIGS. 5A-5B. However, as long as there is no negative effect on the protrusion of the pad surface in practice, part of the protruding pad surface and part of the outflow-side central pad surface can be connected by a bridge surface as in the structure shown in FIGS.

8A-8B. In the example of the structure shown in FIGS. 8A-8B, a shallow groove bottom (step surface [2]) may be formed to surround the protruding pad surface 718 with the exception of the region of the bridge surface 719. These regions may also be the bottom of deep groove [3].

In this structure, the heater element 221 may also formed in projected region A on the outlet side with the pad surface 718 in the normal direction of the trailing edge 211. Trailing edge 211 of the slider body is the bottom surface [3] of the deep groove, and the initial recess amount of the element unit 122 may be greater than the depth of the deep groove. As regards the initial recess amount, the description given with regard to other preferred structures may be applied to this structure as well.

The structures and dimensions described above are a preferred embodiment. However, the invention is not limited to these embodiments and descriptions. Persons skilled in the art will be easily able to conceive of variations, additions, and alterations to the various elements of the embodiments within the spirit of the invention. For example, embodiments described above are particularly useful in HDDs, but they may also be applied in the manufacture of magnetic disks used in other devices, or to devices which float a head on these magnetic disks.

The invention may be applied to a floating head with one, or three or more levels of groove depth. With this type of floating head, the initial recess amount is preferably greater than the depth of the shallowest groove, and more preferably is deeper than the deepest groove, in some approaches.

In one embodiment, a magnetic data storage system may include at least one floating head as described herein according to any embodiment, a magnetic medium, a drive mechanism for passing the magnetic medium over the at least one floating head, and a controller electrically coupled to the at least one floating head for controlling operation of the at least one floating head.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A device, comprising:
a disk rotating drive unit for rotating a magnetic disk;
a floating head for floating above the rotating magnetic disk, the floating head comprising a slider body and an element unit formed on a trailing edge of the slider body, the slider body having at least one air bearing surface, the element unit having an air bearing surface;
a support mechanism for supporting the floating head above the magnetic disk; and
a controller for causing contact between the magnetic disk and a protruding portion of the slider body of the floating head,
wherein the protruding portion and the element unit are physically characterized as exhibiting protrusion upon application of power to a heater element of the element unit, and
wherein an air bearing surface of the element unit closest to the magnetic disk is configured to be spaced from the magnetic disk when the protruding portion contacts the magnetic disk.

2. The device as recite in claim 1, wherein the floating surface of the slider body comprises:

a first air bearing surface for generating a positive pressure, the first air bearing surface having a center more toward an outflow side of the floating surface than toward a center of the floating surface; and
a second air bearing surface on the outflow side of the first air bearing surface, the second air bearing surface being smaller than the first air bearing surface,
wherein the floating surface of the slider body is brought into contact with the magnetic disk by causing the second air bearing surface to protrude due to application of power to the heater element.

3. The device as recited in claim 2, wherein the second air bearing surface is separated completely from the first air bearing surface by a groove between the second air bearing surface and the first air bearing surface.

4. The device as recited in claim 2, wherein a portion of the first air bearing surface extends to an inner side and to an outer side of the second air bearing surface.

5. The device as recited in claim 2, wherein an initial recess amount for the element unit is at least about 4 nm.

6. The device as recited in claim 1, wherein an initial recess amount for the element unit is greater than a deepest portion of a groove in the floating surface of the slider body.

7. The device as recited in claim 1, wherein the protruding portion of the slider body is physically characterized as always being closer to the magnetic disk than the element unit upon application of power to the heater element of the element unit.

8. A floating head, comprising:
a slider body comprising AlTiC, the slider body having an air bearing surface;
an element unit positioned on a trailing edge of the slider body,
a heater element positioned in a protective film of the element unit,
an air bearing surface of the element unit having an initial recess amount from an immediately adjacent portion of the slider body of at least about 4 nm in a direction perpendicular to the air bearing surface of the element unit when the heater element is off; and
wherein a protruding portion of the air bearing surface of the slider body is physically characterized as always protruding farther than all portions of the element unit in the direction perpendicular to the air bearing surface of the element unit upon application of power to the heater element.

9. The floating head as recited in claim 8, wherein the floating surface of the slider body comprises:
a first air bearing surface for generating a positive pressure, the first air bearing surface having a center more toward an outflow side of the floating surface than toward a center of the floating surface; and
a second air bearing surface on the outflow side of the first air bearing surface, wherein the second air bearing surface is smaller than the first air bearing surface.

10. The floating head as recited in claim 9, wherein the second air bearing surface is separated completely from the first air bearing surface by a groove between the second air bearing surface and the first air bearing surface.

11. The floating head as recited in claim 9, wherein a portion of the first air bearing surface extends to an inner side and to an outer side of the second air bearing surface.

12. The floating head as recited in claim 8, wherein an initial recess amount of the element unit is greater than a shallowest portion of a groove in an air bearing surface of the slider body.

13. A magnetic data storage system, comprising:
at least one floating head as recited in claim 8;
a magnetic medium;
a drive mechanism for passing the magnetic medium over the at least one floating head; and
a controller electrically coupled to the at least one floating head for controlling operation of the at least one floating head.

14. A method of manufacturing a magnetic disk, the method comprising:
rotating a magnetic disk;
supporting the floating head as recited in claim 8 on the rotating magnetic disk, the floating head having a slider body and an element unit formed on a trailing edge of the slider body;
contacting a floating surface of the slider body with the magnetic disk; and
protruding a portion of the floating head toward the magnetic disk due to application of power to a heater element of the element unit,
wherein the element unit is positioned away from the magnetic disk.

15. The method of manufacturing a magnetic disk as recited in claim 14, wherein the floating surface of the slider body comprises:
a first air bearing surface for generating a positive pressure, the first air bearing surface having a center more toward an outflow side of the floating surface than toward a center of the floating surface; and
a second air bearing surface on the outflow side of the first air bearing surface, wherein the second air bearing surface is smaller than the first air bearing surface, and
wherein the floating surface of the slider body is brought into contact with the magnetic disk by causing the second air bearing surface to protrude due to application of power to the heater element.

16. The method of manufacturing a magnetic disk as recited in claim 15, wherein the second air bearing surface is separated completely from the first air bearing surface by a groove between the first air bearing surface and the second air bearing surface.

17. The method of manufacturing a magnetic disk as recited in claim 15, wherein a portion of the first air bearing surface extends to an inner referral edge and to an outer edge of the second air bearing surface.

18. The method of manufacturing a magnetic disk as recited in claim 14, wherein an initial recess amount for the element unit is at least about 4 nm.

19. The method of manufacturing a magnetic disk as recited in claim 14, wherein an initial recess amount for the element unit is greater than a deepest portion of a groove in the floating surface of the slider body.

* * * * *

UNITED STATES PATENT AND TRADEMARK OFFICE
CERTIFICATE OF CORRECTION

PATENT NO. : 8,711,520 B2
APPLICATION NO. : 12/970775
DATED : April 29, 2014
INVENTOR(S) : Koike et al.

Page 1 of 1

It is certified that error appears in the above-identified patent and that said Letters Patent is hereby corrected as shown below:

In the specification:

col. 10, line 67 replace "bailing" with --trailing--.

Signed and Sealed this
Twenty-second Day of July, 2014

Michelle K. Lee
*Deputy Director of the United States Patent and Trademark Office*